US007678201B2

(12) United States Patent  
Cobb

(10) Patent No.: US 7,678,201 B2
(45) Date of Patent: *Mar. 16, 2010

(54) COMPOSITION AND PROCESS FOR THE REMOVAL AND RECOVERY OF HYDROCARBONS FROM SUBSTRATES

(75) Inventor: Harvey G. Cobb, N. Little Rock, AR (US)

(73) Assignee: Coriba Technologies, L.L.C., Shreveport, LA (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/491,790

(22) Filed: Jul. 24, 2006

(65) Prior Publication Data

US 2007/0023362 A1 Feb. 1, 2007

Related U.S. Application Data

(60) Provisional application No. 60/701,721, filed on Jul. 22, 2005.

(51) Int. Cl.
B08B 3/04 (2006.01)
(52) U.S. Cl. .................. 134/40; 208/390; 208/391; 166/270; 166/270.1; 210/708; 175/66; 134/10; 134/25.1; 134/34; 134/36; 134/42
(58) Field of Classification Search ......... 208/390–391; 166/270, 270.1; 210/708; 175/66; 134/10, 134/25.1, 34, 36, 40, 42
See application file for complete search history.

(56) References Cited

U.S. PATENT DOCUMENTS

| 2,718,514 | A | | 9/1955 | Fantl |
|-----------|---|---|--------|-------|
| 3,334,688 | A | | 8/1967 | Blackwell et al. |
| 3,628,728 | A | * | 12/1971 | Polutnik et al. ............ 239/159 |
| 3,637,017 | A | | 1/1972 | Gale et al. |
| 3,660,268 | A | * | 5/1972 | Kelly ........................ 208/390 |
| 3,902,557 | A | | 9/1975 | Shaughnessy et al. |
| 3,954,627 | A | | 5/1976 | Dreher et al. |
| 3,997,451 | A | | 12/1976 | Plummer et al. |
| 4,357,175 | A | | 11/1982 | Buffington et al. |
| 4,553,593 | A | | 11/1985 | Shaw |
| 4,599,117 | A | | 7/1986 | Luxemburg |
| 4,634,540 | A | | 1/1987 | Ropp |
| 4,645,608 | A | * | 2/1987 | Rayborn ..................... 507/128 |
| 4,813,482 | A | | 3/1989 | Walton et al. |
| 4,846,275 | A | | 7/1989 | McKay |

(Continued)

FOREIGN PATENT DOCUMENTS

CA 2177018 5/1996

(Continued)

OTHER PUBLICATIONS

Keller et al., A Unique, Reagent-Based, Separation Method for Tar Sands and Environmental Clean Ups, AIChE 2001 Annual Meeting, Nov. 6, 2001, Reno, Nevada, 16 pages.

(Continued)

Primary Examiner—Sharidan Carrillo
(74) Attorney, Agent, or Firm—Bracewell & Giuliani LLP

(57) ABSTRACT

The invention relates to a chemical composition and a process for using the chemical composition to remove and recover petroleum hydrocarbons from a contaminated substrate including an ammonia compound; a nitrogen-containing compound; and an aqueous carrier solution.

22 Claims, 2 Drawing Sheets

U.S. PATENT DOCUMENTS

| | | |
|---|---|---|
| 4,929,341 A | 5/1990 | Thirumalachar et al. |
| 5,042,580 A | 8/1991 | Cullick et al. |
| 5,085,710 A | 2/1992 | Goss |
| 5,306,416 A | 4/1994 | Le et al. |
| 5,725,802 A | 3/1998 | Chittofrati et al. |
| 5,797,701 A | 8/1998 | Conaway |
| 5,922,653 A | 7/1999 | Ahmed et al. |
| 5,928,522 A | 7/1999 | Conaway |
| 6,000,412 A * | 12/1999 | Chan et al. ............... 134/22.14 |
| 6,096,227 A | 8/2000 | Conaway |
| 6,105,672 A | 8/2000 | Deruyter et al. |
| 6,225,263 B1 | 5/2001 | Collins et al. |
| 6,251,290 B1 | 6/2001 | Conaway |
| 6,267,893 B1 | 7/2001 | Luxemburg |
| 6,325,152 B1 | 12/2001 | Kelley et al. |
| 6,405,796 B1 | 6/2002 | Meyer et al. |
| 6,454,003 B1 | 9/2002 | Chang et al. |
| 6,543,535 B2 | 4/2003 | Converse et al. |
| 6,576,145 B2 | 6/2003 | Conaway et al. |
| 6,673,231 B2 | 1/2004 | Kim et al. |
| 2004/0050755 A1 | 3/2004 | Page et al. |
| 2005/0224230 A1* | 10/2005 | Cobb .......................... 166/266 |
| 2006/0076273 A1* | 4/2006 | Cobb .......................... 208/390 |
| 2007/0023362 A1* | 2/2007 | Cobb .......................... 210/749 |

FOREIGN PATENT DOCUMENTS

| | | |
|---|---|---|
| FR | 2735524 | 12/1996 |
| WO | WO 2005/040435 A1 | 5/2005 |
| WO | WO 2005/100745 A1 | 10/2005 |

OTHER PUBLICATIONS

EPA, A Citizen's Guide to Soil Washing, EPA 542-F-01-008, May 2001, 2 pages.

HydroPure Technologies, Inc., www.hydropuretech.com, 6 pages, 2002.

* cited by examiner

Soil Remediation
Process**

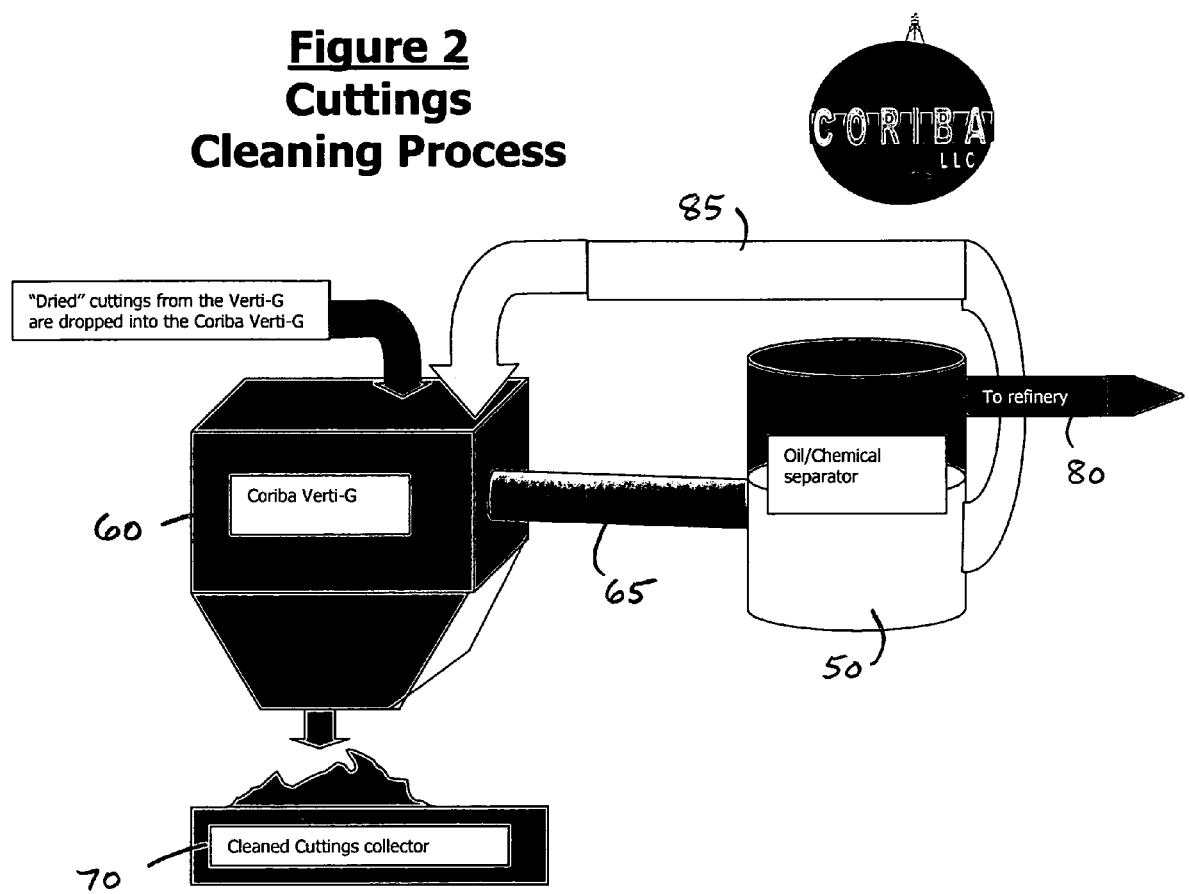

US 7,678,201 B2

COMPOSITION AND PROCESS FOR THE REMOVAL AND RECOVERY OF HYDROCARBONS FROM SUBSTRATES

RELATED APPLICATIONS

This application is related to and claims priority and benefit of U.S. Provisional Patent Application Ser. No. 60/701,721, filed Jul. 22, 2005, titled "Composition and Process for the Removal and Recovery of hydrocarbons from Substrates," which is incorporated herein by reference in its entirety.

TECHNICAL FIELD OF THE INVENTION

The present invention relates to a chemical composition and a process for using the chemical composition to remove and recover petroleum hydrocarbons from a contaminated substrate.

BACKGROUND OF THE INVENTION

In the petroleum industry, it is common for substrates to become contaminated with petroleum hydrocarbons. One particular example of a substrate that can become contaminated is ground soil. In industrial areas, it is common for petroleum hydrocarbons to spill onto ground soil during normal drilling or storage operations or while in transit. Over time, repeated spills can result in excessive hydrocarbon accumulation in the ground soil, which can potentially become an environmental hazard. Further, these spilled hydrocarbons are a valuable commodity from which economic value is not being realized. As a result, the industry has traditionally sought improved means for remediating the contaminated ground soils in order to remove and/or recover substantially all of the hydrocarbons contained therein.

Examples of previously used methods for removing petroleum hydrocarbons from contaminated soils include, for example, excavation, microbial remediation, phytoregeneration, thermal desorption, incineration and soil washing; however, these previously used methods have been expensive, difficult or dangerous to use, inefficient and/or have not provided the desired degree of separation of the components in the substrate. Further, none of the previously used methods allow for recovery of petroleum hydrocarbons for refining.

There are also particular disadvantages associated with each of these previously used methods. For example, excavation only changes the location, and not the contaminated nature, of the substrate. Further, the use of indigenous substrate types to refill excavation sites is often not permitted by local regulations. Microbial remediation, also known as bacterial decay, requires months and sometimes years to complete, and is typically ineffective for large areas contaminated to depths greater than a few inches below the surface. Phytoregeneration, i.e., the planting of fast growing leafy vegetation at the site, requires extensive site preparation and cleanup time. Thermal desorption is extremely slow and expensive, and the "cleaned" substrate is typically only clean enough to use as construction fill. Incineration consumes vast quantities of fossil fuel, discolors the substrate and generates large amounts of carbon dioxide, which could potentially violate air quality standard limitations. Soil washing is expensive and results in the creation of a hazardous waste stream. Soil washing also causes the total destruction of the hydrocarbon and creates a hazardous waste stream.

In addition to ground soil, drill cuttings are another example of a substrate that can become contaminated. Drill cuttings are the accumulated mixture of drilling mud, rock fragments, sediment, fluids, solids and/or specialty chemicals produced in connection with the drilling of exploration, appraisal and production wells. Hydrocarbons are often found in these cuttings. Industry has traditionally used large vertical separators such as the VERTI-G™ dryer to reduce the hydrocarbon and water liquid phase from the cuttings; however, dryers are inefficient and/or have not provided the desired degree of separation of components in the substrate. The most efficient dryers leave between 3% and 10% of the liquid phase in the substrate. Further, these separators did not clean the drill cuttings sufficiently to classify the cuttings as non-hazardous waste suitable for dumping or use in other applications.

Thus, there is a need for an efficient and cost effective technique to maximize removal and recovery of petroleum hydrocarbons from contaminated substrates, particularly contaminated ground soils and petroleum drilling cuttings. Also, there is a need for a process for petroleum hydrocarbon recovery from contaminated substrates that utilizes simple or existing equipment. Further, there is a need for a composition that can be added to contaminated substrates to recover substantially all of the petroleum hydrocarbons without resulting in excessive reaction with the contaminated substrate components or damage to the petroleum hydrocarbons.

SUMMARY OF THE INVENTION

The present invention advantageously meets one or more of these needs and provides a composition and method for recovering petroleum hydrocarbons from contaminated substrates.

The invention includes a chemical composition having organic chemicals, the chemical composition being effective to stimulate the separation, removal and/or recovery of petroleum hydrocarbons from contaminated substrates such as ground soil deposits, petroleum drilling cuttings or similar applications. The invention also includes a process for recovering petroleum hydrocarbons and similar hydrocarbon oils from contaminated substrates using the chemical composition. The process also provides for cleaning of substrates. The chemical composition preferably includes a nitrogen-containing compound, an alcohol compound, or a combination of both blended in an aqueous carrier solution. The nitrogen-containing compound is preferably ammonia or ammonium hydroxide. The aqueous carrier solution is of sufficient volume to disperse at least one of the nitrogen-containing compound and the alcohol compound in the aqueous carrier solution. The nitrogen-containing compound and the alcohol compound are preferably substantially distributed throughout the carrier fluid. The concentrations of the nitrogen-containing compound and the alcohol compound in the chemical composition are in amounts effective to promote the separation of petroleum hydrocarbons from the substrate when the substrate is brought into contact with the chemical composition. While heating is not required, slight elevation of temperature has shown positive effects. The chemical composition is preferably noncorrosive, nonreactive, nontoxic and nonflammable.

In a preferred embodiment, the alcohol compound useful in the chemical composition of the invention contains from about one to about eight carbon atoms. The alcohol compound is preferably non-aromatic. More particularly, alcohols containing one to four carbons are particularly useful, i.e. methyl, ethyl, propyl, and/or butyl alcohol. Of the propyl alcohols, isopropyl alcohol is particularly preferred. Alcohol is preferred in an amount of approximately 4 to 24 percent by volume of the chemical composition.

In the chemical composition of the invention, a preferred carrier solution is water. This solution can also be fresh water or brine. Aqueous carrier solutions are preferred. In a preferred embodiment, there is only one carrier solution and it is substantially all water. The carrier solution in an amount of approximately 76 to 94 percent by volume of the chemical composition is preferred.

The nitrogen-containing compound of the chemical composition is preferably ammonia or ammonium hydroxide, and is present in an amount of approximately 2 to 8 percent by volume of the chemical composition. In the preferred embodiment, hydrogen peroxide is present in an amount of approximately 0.15 to 1.5 percent by volume in the chemical composition.

This invention includes a process for recovering petroleum hydrocarbons from contaminated substrates located in ground soil. The process of the invention includes treating the contaminated ground soil with the chemical composition, and passing the treated contaminated ground soil through one or more of a mixer, a vertical hopper and a dryer in order to facilitate removal of substantially all of the hydrocarbons from the ground soil. The present invention also includes a process for recovering petroleum hydrocarbons from contaminated substrates located in contaminated drill cuttings. The contaminated drill cuttings are treated with the chemical composition, and the treated contaminated drill cuttings are passed through at least a dryer in order to facilitate removal of substantially all of the hydrocarbons from the cuttings.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof that are illustrated in the appended drawings, which form a part of this specification. It is to be noted, however, that the drawings illustrate only a preferred embodiment of the invention and are therefore not to be considered limiting of the invention's scope as it may admit to other equally effective embodiments.

FIG. 2 is a simplified side view of a process for petroleum hydrocarbons recovery that includes treating contaminated drilling cuttings with a chemical composition in a dryer according to an embodiment of the present invention.

DETAILED DESCRIPTION

Figure 1:
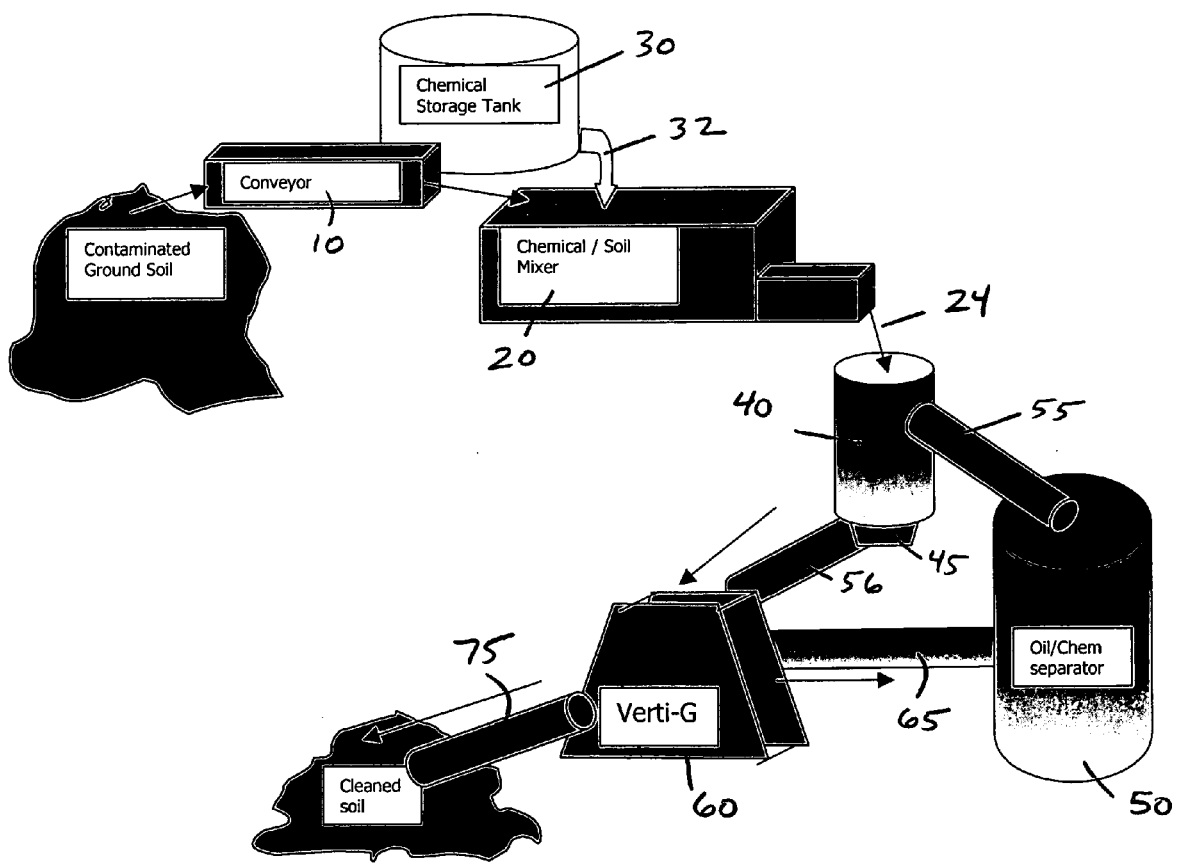
FIG. 1 is a simplified side view of a process for petroleum hydrocarbons recovery that includes treating contaminated ground soil with a chemical composition in a mixer and passing the treated contaminated ground soil through a vertical hopper according to an embodiment of the present invention.

In one embodiment, as illustrated in FIG. 1, the composition and process of the present invention may be utilized to remove and recover petroleum hydrocarbons from contaminated ground soil. Preferably, the contaminated soil is first collected from the ground and passed through a screening device (not shown), for example a shaker, in order to sort and remove larger and/or medium sized trash and debris. In one embodiment, larger trash can be, for example, more than 1.00 cubic foot in size, and medium-sized trash can be, for example, between 0.25 and 1.00 cubic feet in size. Preferably, the screening device has shaking or vibrating stainless steel screens that allow the contaminated soil to sift through while the trash and debris are trapped in the screens, removed and eventually collected in a trough. Examples of trash and debris that may be found in the contaminated soil include chunks of wood, stone, rocks, plastic bottles and metal trash. The screening device insures that the larger objects do not pass along to subsequent stages of the process. Preferably, a secondary screener/sorter can be used to separate any additional debris from the contaminated soil. In certain embodiments, the additional debris can be incinerated and/or high-pressure chemical spray can be used to recover hydrocarbons from the captured debris materials.

After passing through the screener, the contaminated soil, devoid of larger debris, can be transported to one or more subsequent stages of the process via an auger or conveyor 10. In one embodiment, the soil is transported via conveyor 10 to a chemical/soil mixer 20. In one embodiment, the mixer 20 is similar to a large, mobile concrete mixer. The size of the mixer 20 is preferably based upon the volume of contaminated soils to be processed. It is typically necessary to have the capability to process hundreds or even thousands of tons of contaminated soil per hour. Once in the mixer 20, the contaminated soil is mixed with the chemical composition of the present invention to form treated soil 22. The mixing phase allows the chemical to contact the substrate in order to break the surface tension between the hydrocarbon and the substrate. The chemical composition can be supplied from a chemical storage tank 30 as illustrated by stream 32, or from another source as is understood by those skilled in the art. Preferably, the chemical composition completely wets the contaminated soil while the soil and chemical composition are agitated in the mixer 20 such that the resulting treated soil 22 is in the form of a slurry solution.

In a preferred embodiment, the treated soil 22 exits the mixer 20 via stream 24 and falls or is supplied into a vertical hopper 40 with a conical bottom 45. The hopper 40 is at least partially filled with the chemical composition of the present invention. As the treated soil 22 travels through the hopper 40, it comes into contact with the chemical composition inside the hopper 40. The chemical wets the treated soil 22 even further, preferably causing the slurry material to separate into layers or phases. The layers preferably include a petroleum hydrocarbon layer, a cleaned soil layer and an aqueous chemical layer. In a preferred embodiment, only these three layers exist, with only some traces of other components. Preferably, the petroleum hydrocarbon will substantially separate from the treated soil 22 and form a layer that floats to the surface, where it can be skimmed and removed from the hopper 40. Suitable separation space is provided within hopper 40. Once removed from the hopper 40, the hydrocarbon can be transported to, for example, an oil production storage tank. After treatment according to the present invention, the cleaned soil, substantially devoid of hydrocarbon, will preferably form a layer that sinks to the bottom of the hopper 40 and eventually settles into the conical bottom 45. The aqueous chemical preferably also forms its own distinct layer.

In an alternative embodiment, a liquid layer containing hydrocarbon and aqueous chemical composition will form within the hopper 40 and can be separated from the cleaned solids. This liquid layer is sent via line 55 to an oil/chemical separator 50 for further separation of the components. In the separator 50, the petroleum hydrocarbons are separated from the aqueous chemical composition and sent to a production facility or other desired location, and the remaining chemical composition is recovered and returned to the chemical tank 30 or mixer 20 or used for another desired purpose.

In an embodiment of the present invention, the cleaned soil that settles into the conical bottom 45 of the hopper 40 is fed via line 56 to a vertical dryer 60, for example a VERTI-G™- type centrifuge, to recover any residual hydrocarbon and/or chemical composition from the cleaned soil. The dryer 60 limits the loss of chemical due to absorption in the soil substrate to about 1-2% by volume. Preferably, the residual hydrocarbon and/or chemical composition recovered from the cleaned soil can be transported via line 65 to the separator 50, if necessary, for further treatment. The cleaned soil in the dryer 60 is then preferably removed from the dryer 60 via line 75 and tested for hazardous material content. If the material content in the cleaned soil is found to be acceptable, the soil can be used, for example, to fill the excavation scar from which it was originally removed. If, however, a high level of hazardous materials is present, the soil is preferably sent through a second, smaller process unit according to the present invention (not shown) in order to achieve the desired material content. If desired, soil can also be tested in a similar fashion at or near line 56 upon removal from the conical bottom 45 of the hopper 40.

FIG. 2 shows an embodiment of the present invention in which hydrocarbons are recovered from petroleum drilling cuttings, as would typically be produced by a drill bore on a petroleum drilling rig. On a typical drilling rig, cuttings are produced at a rate of about twenty tons per hour depending on the speed and diameter of the drill bore. Typically, these cuttings are initially passed through a large cuttings dryer, for example a VERTI-G™-type dryer, on the drilling rig in order to separate and remove a majority percentage of the hydrocarbon oil from the cuttings. Typically, the cuttings contain about 3-5% oil content after treatment in the cuttings dryer.

According to an embodiment of the present invention, the "dried" cuttings from the cuttings dryer are passed through an additional, smaller dryer 60 such as, for example, a vertical, two-phase centrifuge. The chemical composition of the present invention is contacted with the "dried" cuttings inside of the dryer 60. The chemical composition can be supplied to the dryer 60 from a chemical storage tank 30, an oil/chemical separator 50, or another source as is understood by those skilled in the art. The petroleum hydrocarbon will preferably form its own layer which floats and is substantially separate from the drilling cuttings inside the dryer. The cleaned cuttings, preferably substantially devoid of hydrocarbon, will be collected in a cleaned cuttings collector 70 positioned at or near the bottom of the dryer 60. Preferably, the cuttings contain less than 1% hydrocarbon oil and thus would not be classified as hazardous waste. These cleaned cuttings could be scattered on the ocean floor or near a land-based rig or otherwise disposed of subject to EPA approval. In one embodiment, the petroleum hydrocarbon and chemical composition are removed from the dryer 60 and be transported via line 65 to an oil/chemical separator 50 for further separation. After separation, the hydrocarbons can be removed from separator 50 and sent via line 80 to a production facility or other desired location, and the chemical composition can be removed from separator 50 and recycled via line 85 for use in treating another batch of cuttings in the dryer 60.

Typically, the process for treating drilling cuttings as shown in FIG. 2 and the process for soil remediation illustrated in FIG. 1 can be performed using the same equipment; however, this is not always the case. For example, contaminated ground soil can contain foreign objects, and thus the use of a screener to remove these objects can be advantageous in certain embodiments. Also, it is typically necessary or desirable to recover the chemical composition from wetted drill cuttings substrate; thus, a vertical dryer 60 can be especially advantageous in certain drill cutting-related embodiments.

In the embodiments shown in FIGS. 1-2, the chemical composition of the present invention can be recycled and reused without the need for significant treatment. Upon separation of the petroleum hydrocarbons and other components into layers, the chemical composition of the present invention will preferably form its own distinct aqueous layer that can be easily removed from the mixer 20, hopper 40 and/or dryer 60 and treated so that it can be reused. Advantageously, the chemical composition does not appear to saponify, emulsify, damage or react with petroleum hydrocarbons, nor is a significant amount of the composition dissolved into or entrained in the petroleum hydrocarbons. Thus, the chemical can be easily recovered and reused.

In a preferred embodiment, the chemical composition includes a nitrogen-containing compound, an alcohol compound and an aqueous carrier solution. Alcohols can generally be defined as R—OH where R is a combination of carbon and hydrogen atoms, water being excluded from such definition. The preferred alcohol of the invention is straight chained, as opposed to an aromatic, and has a continuous chain of carbon atoms from 1 to 8 carbons long. Saturated alcohols are generally preferred, as they tend to be more stable than unsaturated alcohols. Methyl alcohol, ethyl alcohol, and butyl alcohol are preferred. Propyl alcohol is particularly preferred. Of the propyl alcohols, isopropyl alcohol is particularly preferred. Mixtures of methyl, ethyl, propyl and/or butyl alcohols to create the alcohol of the invention are also encompassed in this invention. A mixture of ethyl and propyl alcohol is preferred. As the chemistry of the alcohol molecule is dominated by the functional OH group, it is understood by those skilled in the art that other alcohols can be effective alone or in combination. However, the use of only one alcohol having a continuous chain of 1 to 8 carbons or only one alcohol, that alcohol being the mixture of the one to eight carbon alcohols without other alcohols, is effective and preferred.

Notably, alcohols can also be created in situ, for example, through the reaction of salts with appropriate reagents in the presence of water. Creation of the alcohol in situ is also encompassed in this invention.

In an alternative embodiment, surfactants can be added to the chemical composition in order to decrease the water-oil interfacial tension and to improve the efficiency. In one particularly cost-effective embodiment, the invention provides efficient results through the use of a combination of only the carrier solution and one or more of the nitrogen-containing compound and the alcohol compound.

The nitrogen containing compound is preferably ammonia. Ammonia can be provided in many forms, the preferred forms being anhydrous ammonia and ammonium hydroxide. Ammonia can be produced by reaction or dissociation. Ammonium ions such as dissolved ammonium salts are also encompassed within the invention. Ammonia is quite soluble in water, dissolving to the extent of about 700 volumes in 1 volume of solvent. The dissolving process is accompanied by the reaction $NH_3 + H_2O$ thereby producing $NH_4^+ + OH^-$. This is referred to as ammonium hydroxide. Therefore, ammonium hydroxide, which is often produced commercially with significant amounts of ammonia in water, is included in the term ammonia in this invention. Also encompassed are other precursors that form the ammonium ion in situ.

Isopropyl alcohol, also known as isopropanol, has a formula of $C_3H_8O$ and is unsaturated. This is a particularly preferred alcohol compound of the invention. It is noted that isopropyl alcohol has a boiling point of 82.4 degrees C. and specific gravity of 0.78 at 20 degrees C. The air odor threshold concentration of isopropyl alcohol to be as 22 parts per million (ppm) parts of air. Contact between isopropyl alcohol and air occasionally results in the formation of peroxides, another possible element of the composition, whether added or created in situ. Therefore, in an embodiment of the invention, peroxide is formed from isopropyl alcohol. In another embodiment, peroxide is added to the composition when, for example, no isopropyl alcohol is present.

While the invention has been shown or described in only some of its forms, it should be apparent to those skilled in the art that it is not so limited, but is susceptible to various changes without departing from the scope of the invention.

What is claimed:

1. A process for cleaning petroleum hydrocarbons from a substrate, the process comprising;
    introducing a chemical composition into the substrate in an amount effective to, when added to the substrate, substantially separate the petroleum hydrocarbons from the substrate without the formation of an emulsion, wherein the chemical composition comprises: an absence of a surfactant;
    an alcohol compound;
    a nitrogen-containing compound; and
    an aqueous carrier solution, the aqueous carrier solution being of sufficient volume operable to disperse at least one of the nitrogen-containing compound and the alcohol compound in the aqueous carrier solution, the nitrogen-containing compound and alcohol compound being substantially distributed throughout the aqueous carrier solution, the concentration of the nitrogen-containing compound and alcohol compound in the chemical composition being an amount effective to promote the separation of the petroleum hydrocarbons from the substrate; and
    removing the petroleum hydrocarbons from the substrate.

2. The process of claim 1, further comprising recovering the petroleum hydrocarbons from the substrate.

3. The process of claim 1, wherein the substrate is ground soil.

4. The process of claim 1, wherein the substrate is drill cuttings.

5. The process of claim 1 further comprising the step of recovering at least a portion of the chemical composition subsequent to the introduction of the chemical composition into the substrate such that the chemical composition can be used again.

6. The process of claim 1, wherein the process is conducted in the absence of heating.

7. The process of claim 1 wherein the aqueous carrier solution is substantially all water.

8. The process of claim 1 wherein the aqueous carrier solution consists essentially of water.

9. The process of claim 1 wherein the aqueous carrier solution is in an amount of approximately 76 to 94 percent by volume of the chemical composition.

10. The process of claim 1 wherein the alcohol compound contains from about one to about eight carbon atoms and is non-aromatic.

11. The process of claim 1 wherein the alcohol compound is propyl alcohol.

12. The process of claim 1 wherein the alcohol compound is isopropyl alcohol.

13. The process of claim 1 wherein the alcohol compound is butyl alcohol.

14. The process of claim 1 wherein the alcohol compound is ethyl alcohol.

15. The process of claim 1 wherein the alcohol compound is methyl alcohol.

16. The process of claim 1 wherein the alcohol compound is in an amount of approximately 0.1 to 16.0 percent by volume of the chemical composition.

17. The process of claim 1 wherein the nitrogen-containing compound is ammonia.

18. The process of claim 1 wherein the nitrogen-containing compound is in an amount of approximately 0.1 to 8.0 percent by volume of the chemical composition.

19. The Process of claim 1, further comprising applying heat to the chemical composition.

20. The process of claim 1, wherein the alcohol compound is selected from the group consisting of methyl alcohol, ethyl alcohol, propyl alcohol, isopropyl alcohol and combinations thereof.

21. A process for cleaning petroleum hydrocarbons from a substrate, the process comprising:
    introducing a chemical composition into the substrate in an amount effective to, when added to the substrate, substantially separate the petroleum hydrocarbons from the substrate without the formation of an emulsion, wherein the chemical composition comprises: an absence of a surfactant;
    an alcohol compound;
    a nitrogen-containing compound; and
    an aqueous carrier solution, the aqueous carrier solution being of sufficient volume operable to disperse at least one of the nitrogen-containing compound and the alcohol compound in the aqueous carrier solution, the nitrogen-containing compound and alcohol compound being substantially distributed throughout the aqueous carrier solution, the concentration of the nitrogen-containing compound and alcohol compound in the chemical composition being an amount effective to promote the separation of the petroleum hydrocarbons from the substrate; and
    removing the petroleum hydrocarbons from the substrate, wherein the substrate is selected from the group consisting of drill cuttings, ground soil, and combinations thereof.

22. A process for cleaning petroleum hydrocarbons from a substrate, the process comprising:
    introducing a chemical composition into the substrate in an amount effective to, when added to the substrate, substantially separate the petroleum hydrocarbons from the substrate, wherein the chemical composition comprises:
    an absence of a surfactant;
    an alcohol compound;
    a nitrogen-containing compound; and
    an aqueous carrier solution, the aqueous carrier solution being of sufficient volume operable to disperse at least one of the nitrogen-containing compound and the alcohol compound in the aqueous carrier solution, the nitrogen-containing compound and alcohol compound being substantially distributed throughout the aqueous carrier solution, the concentration of the nitrogen-containing compound and alcohol compound in the chemical composition being an amount effective to promote the separation of the petroleum hydrocarbons from the substrate; and
    removing the petroleum hydrocarbons from the substrate.

* * * * *